TAPE REWIND CONTROL

Filed Oct. 10, 1962 4 Sheets-Sheet 1

INVENTOR
TREVOR DRAKE READER

BY Edward M. Farrell

ATTORNEY

Aug. 10, 1965 T. D. READER 3,199,800

TAPE REWIND CONTROL

Filed Oct. 10, 1962 4 Sheets-Sheet 3

Aug. 10, 1965 T. D. READER 3,199,800

TAPE REWIND CONTROL

Filed Oct. 10, 1962 4 Sheets-Sheet 4

BALANCE POINT CONTROL AMPLIFIER

REEL SERVO AMPLIFIER

United States Patent Office 3,199,800 Patented Aug. 10, 1965

3,199,800

TAPE REWIND CONTROL

Trevor Drake Reader, Wayne, Pa., assignor to Sperry Rand Corporation, New York, N.Y., a corporation of Delaware Filed Oct. 10, 1962, Ser. No. 229,617
5 Claims. (Cl. 242—55.12)

This invention concerns a control system for controlling the rewinding of the tape in a tape transport which utilizes a vacuum capstan to move the tape over a transducer and vacuum loop boxes in the tape path to provide buffer lengths of tape between a supply reel and the capstan and between a take-up reel and the capstan. More specifically, this invention concerns an arrangement for utilizing the loop length sensors in one of the loop boxes to control both reels during rewind while the loop in the other loop box is kept at a maximum length.

Rewinding has in the past involved either the removal of the tape from the vacuum loop boxes so that the rewind could be effected by driving the reels, or the use of the capstan to move the tape in rewind with the tape loops remaining in the loop boxes and the reel motors being controlled in accordance with loop length. Each of these systems has disadvantages. The former requires time for removing and replacing the loop in their boxes while the latter does not allow the rewind to be carried out at maximum speed even if the capstan has several speeds available. It is accordingly an object of this invention to provide an improved rewind system.

Another object of this invention is the provision of a rewind system which utilizes the maximum speed capabilities of the reel drives.

A further object of this invention is the provision of a rewind system which can utilize the loop length sensors and reel drive controls to effect a control of the reel speeds during rewind.

In carrying out the objects of this invention there is provided a means for controlling the speed of drive of the supply reel in response to the relative position of the tape loop end in an upper portion of the loop box associated with the supply reel. This means for controlling the supply reel drive speed is so designed that the supply reel is being driven at a maximum speed when the loop in the supply reel loop box extends into the lower portion of the box. Similarly, the rate of drive of the take-up reel is controlled in response to the relative position of the tape loop end in said lower portion. The tape-up reel is, however, driven at a maximum rate when the tape loop end is in the upper portion of the supply reel loop box.

The foregoing objects, advantages, construction and operation of the invention will become more readily apparent from the following description in conjunction with the drawings in which like reference numerals identify like elements in which:

FIGURE 1*a* is a diagram showing a portion of the control circuits for the capstan and the reels as well as the arrangement of the tape transport in a system with which the novel rewind control can be used;

FIGURE 1*b* is a side view of one of the loop boxes;

FIGURE 1*c* is a schematic diagram of the circuit of one of the vacuum switches used in sensing the loop length in a loop box;

FIGURE 1*d* is a cross section view of the vacuum capstan;

FIGURE 1*e* is a cross section view of the vacuum capstan of FIGURE 1*d* taken along line *e*—*e* and shows in schematic form the vacuum and pressure supply system for the capstan;

Figures 1A, 1B, 1C:
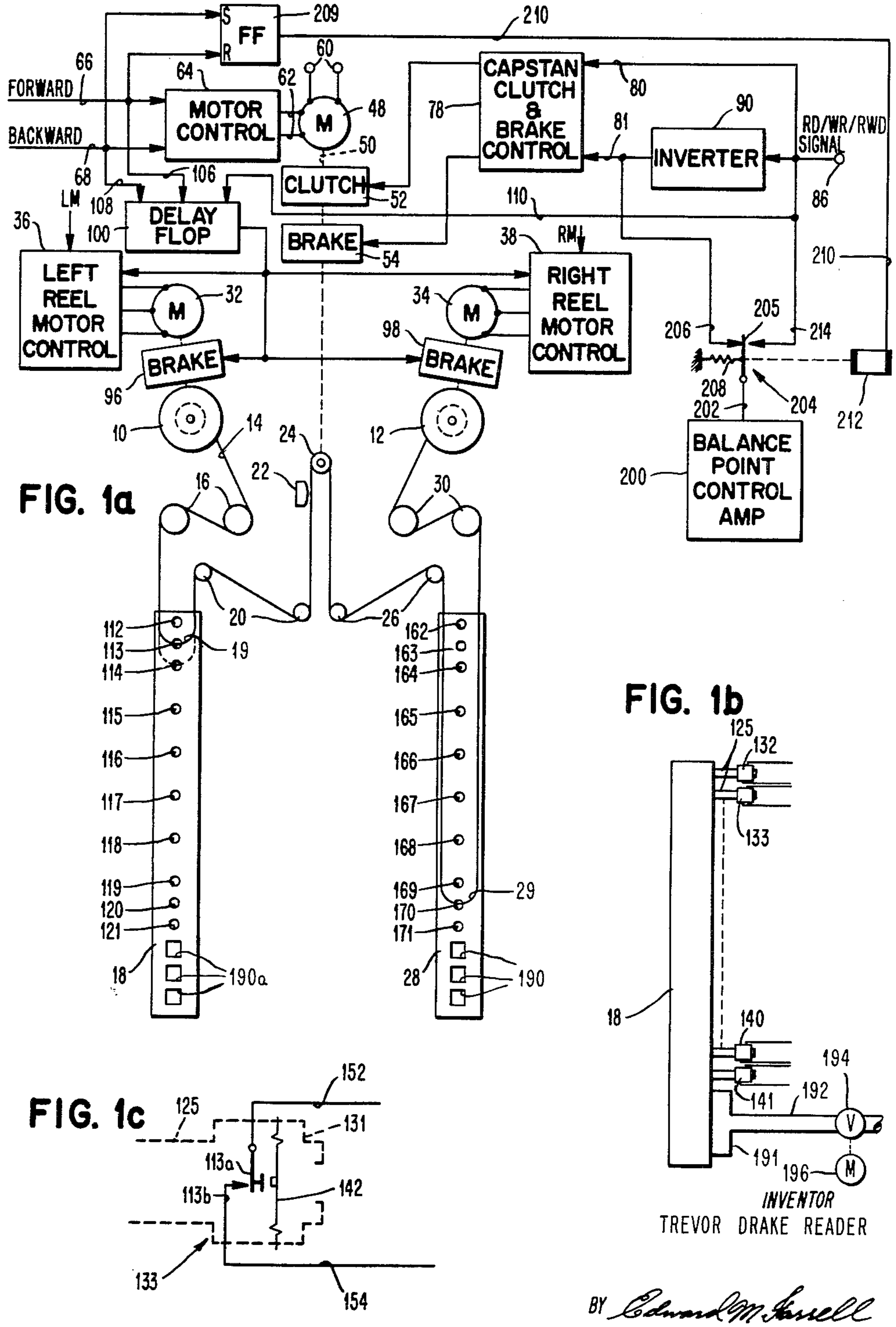

With reference to FIGURE 1*a* a tape transport system of the type with which the invention may be utilized is described insofar as its normal function of transporting tape from a supply reel 10 to a take-up reel 12 is concerned. The tape 14 which in the present embodiment may be magnetic tape of the type generally used in storing digital information, follows a path leading from supply reel 10 over idler pulleys 16 into vacuum loop box 18 to form loop 19 and thence over idler pulleys 20 past the magnetic head 22, over vacuum capstan 24, over idler pulleys 26 into vacuum loop box 28 to form loop 29 and thence over idler pulleys 30 to take-up reel 12.

The loop box 18 is hereafter referred to as the left loop box or the supply loop box while loop box 28 is referred to as the right loop box or the take-up loop box.

The supply reel 10 and take-up reel 12 are driven by reversible motors 32 and 34, respectively. Each of the motors 32 and 34 is controlled by a single motor control circuit, shown in FIGURE 1*a* as blocks 36 and 38, respectively. The motor control is shown in block diagram form in view of the fact that those skilled in the art are cognizant of numerous control circuits which may be utilized for controlling the direction of rotation and the torque of such motors. The left reel motor control is shown as being operated in response to an input signal LM to the block 36, corresponding with the signal LM in FIGURE 2. Likewise, the right reel motor control 38 is under the control of an input signal RM corresponding to signal RM of FIGURE 2.

Figures 1D, 1E:
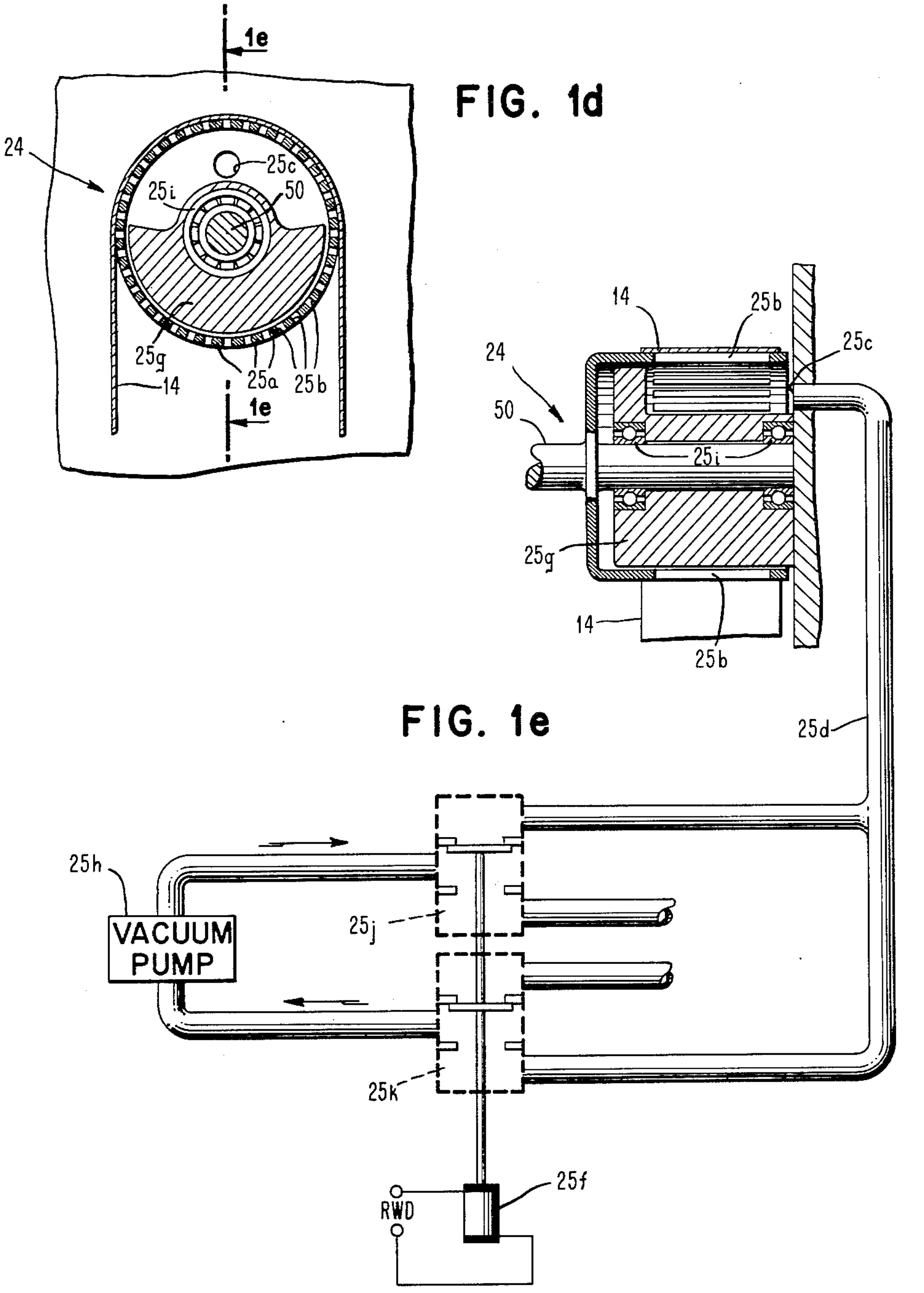

The vacuum capstan 24 which is shown in detail in FIGURES 1*d* and 1*e* is the primary means for moving tape across the magnetic head 22 during a writing of digital data on the tape or a reading of such data from the tape.

It will be evident by reference to FIGURES 1*d* and 1*e* that the capstan 24 is constructed with a cylindrical rotating element 25*a* which has a plurality of slots 25*b* spaced around its periphery. The rotating element 25*a* is rotated by motor 48 (FIGURE 1*a*) through the mechanical linkage 50, shown as a shaft in FIGURE 1*e*. The element 25*a* is mounted in bearings 25*i* which are mounted in the stationary portion 25*g* which serves to prevent leakage through the slots 25*b* in the areas not covered by tape 14.

The vacuum pump 25*h* serves as a source of pressure or vacuum which is selectively coupled to pipe 25*d* and thus to capstan 24 by actuation of solenoid operated valves 25*j* and 25*k* in response to the rewind signal being applied to solenoid 25*f*. If, for example, the solenoid actuator 25*f* is energized the elements of valves 25*j* and 25*k* will be in the positions shown in FIGURE 1*e* and the pump 25*h* will act as a vacuum source connected through valve 25*k* while the pressure side of the pump 25*h* is open to atmosphere through valve 25*j*. Air is then pulled through the slots 25*b* and the tape 14 is drawn into driving contact with the rotating element 25*a*. The tape is then driven in the desired direction by motor 48.

During a rewind operation using the present invention it is desirable to make the rotating capstan ineffective to drive the tape. To accomplish this without stopping the capstan it is necessary to float the tape over the capstan on a film of air. This is accomplished by energizing solenoid actuator 25*f* so that the valve elements 25*j* and 25*k* take the position opposite that shown in FIGURE 1*e*. The pump 25*h* is thus coupled to provide for a source of pressure to pipe 25*d* so that a cushion of air is constantly maintained by the leakage through slots 25*b* and the tape 14 is thus floated out of contact with element 25*a*.

As shown in FIGURE 1*a*, the rotation of the capstan 24 by reversible motor 48 through mechanical connection 50 is under the control of the interposed clutch mechanism 52 and brake mechanism 54. The motor 48 is connected to one phase of a suitable A.C. power source at terminals 60 while terminal 62 is selectively connected to an A.C. source which is of one phase or another in dependence upon the operation of the motor reversing control 64 in response to a forward or reverse signal, respectively. These signals are in the form of a single pulse from lines 66 or 68 and are indicative of a command, for the capstan to move tape in a forward or backward direction, respectively. The forward direction is from supply reel 10 to take-up reel 12. The backward direction is from take-up reel 12 to supply reel 10.

The clutch 52 and the brake 54 are under the control of the Capstan Clutch and Brake control circuitry shown here as block 78. This control circuit may, for example, be of the type shown in patent application Serial Number 1,284, filed by Ori Even-Tov. The input signals to the Capstan Clutch and Brake control 78 are provided on lines 80 and 81 in response to a signal at terminal 86 representing a command to start reading or writing on tape 14 with magnetic head 22. This signal is also present during a rewind operation. Thus, when the read-write-rewind signal at terminal 86 is of a first sense that signal will be effective by way of line 80 to cause the clutch control 78 to engage clutch 52. This signal at terminal 86 will also by way of inverter 90, present a signal of a second and opposite sense at the brake control 78 by way of line 81 to cause a release of brake 54. When the clutch 52 is thus engaged and the brake is released, the motor 48 is effective by way of mechanical linkage 50 to rotate the capstan 24 in a direction corresponding to that established by either a forward signal on line 66 or a backward signal on line 68 to the motor reversing control 64. The tape 14 will then be moved by capstan 24 past head 22 in the desired direction.

When the signal at terminal 86 changes to the second sense it indicates the absence of a command to read or write or rewind and is effective by way of the clutch control 78 to disengage clutch 52. This signal from terminal 86 is simultaneously effective through inverter 90 to present a signal of the first sense on line 81 which is effective to cause the brake control 78 to engage brake 54, thus stopping capstan 24.

Signals of the first and second sense mentioned above may be of different polarity or only of different magnitude depending on the requirements of the control circuits. As an example, the signal of a first sense may be a potential of −95 volts while that of a second sense may be 0 volts.

The rotation of the reels 10 and 12 is produced by the motors 32 and 34, respectively, under the control of the motor control circuits 36 and 38, and the reels are braked by the action of the brake 96 shown on the mechanical linkage between motor 32 and the reel 10 and the brake 98 shown on the mechanical linkage between reel 12 and motor 34. The brakes 96 and 98 are operated in response to signals from retriggerable delay flop 100 which is not only effective to actuate the brakes, but is also simultaneously effective to shut off the power to the reel motor controls 36 and 38 at the same time.

The output of the retriggerable delay flop 100 may be a signal which is normally of a first value unless the delay flop has been triggered at which time the output goes to a second value and is maintained at that second value until the end of the period. At that time the output signal returns to the first value unless during the intervening time an input signal which is effective to retrigger the delay flop has been received on one of the input lines. Such delay flops are well known in the art and therefore will not be described in detail here.

The brakes 96 and 98 are so constructed that they are released in response to an output signal from retriggerable delay flop 100 of a second value. Simultaneously, by virtue of the connections of delay flop 100 to motor controls 36 and 38, the motor controls also have their power turned on so that the motors 32 and 34 are energized. Upon changing back to the said first value, the output of the delay flop 100 is effective to apply the brakes 96 and 98 and to simultaneously shut off the power in the motor controls 36 and 38 to de-energize the motors 32 and 34, respectively.

The input signals to the retriggerable delay flop 100 which are effective to trigger it may be either a signal from line 66 by way of line 106 representing a command for the capstan 24 to move forward during its next period of operation or a signal from line 68 by way of line 108 representing a command for the capstan 24 to move backward during the next period of operation as, for example, during a backward read or a rewind operation. The signals from lines 66 and 68 may be merely pulses of short duration sufficient to trigger delay flop 100 which will then be effective to produce an output signal operable to release brakes 96 and 98 and turn on the motor controls 36 and 38 for the period of the delay flop 100. The period of the delay flop 100 should be sufficient to allow the reels 10 and 12 to be moved so as to establish the desired loop lengths in the vacuum boxes 18 and 28 in preparation for the operation of the capstan 24 in the direction in which it will be rotated during the next operation.

During the reading, writing or rewind operation itself the read-write-rewind signal from terminal 86 will provide a signal on line 110 which will be effective to maintain delay flop 100 in a triggered state as long as that potential exists on line 110. In this triggered state delay flop 100 provides an output signal which is effective to maintain the brakes 96 and 98 in a released condition while maintaining the power to the motor controls 36 and 38 on so that the reels 10 and 12 may be rotated by motors 32 and 34 in accordance with the signals LR and LM as will be explained subsequently.

The vacuum loop box 18 has a plurality of apertures 112–121 in the back wall thereof. Each of these apertures is connected by way of a tube 125 to individual vacuum operated switches 132–141 as shown in FIGURE 1*b*.

Each of the vacuum switches 132–141 is of the type shown diagrammatically in FIGURE 1*c* which shows in detail vacuum switch 133 consisting of a body portion 131 coupled to a tube 125. This body portion 131 supports diaphragm 142 which is exposed on one side to the pressure in loop box 18 at the aperture to which tube 125 is connected. The diaphragm 140 is exposed on the other side to atmospheric pressure by way of an opening in the portion of body 131 shown to the right hand side in FIGURE 1*c*. Thus, diaphragm 142 will remain in the relaxed position shown in FIGURE 1*c* when the pressure at the aperture to which tube 125 is connected is the same as the atmospheric pressure. The contacts **113*a* and 113*b* will then be open to form an open circuit between leads 152 and 154. When a pressure less than atmospheric is present at the aperture to which tube 125 is connected the diaphragm 142 is deformed to cause contact 113*a* to be made with contact 150 to form a complete circuit between leads 152 and 154**.

The vacuum loop box 28 is constructed similarly to vacuum loop box 18 and has a similar plurality of apertures 162–171 which are connected by way of tubes 125 to vacuum switches which are likewise of the type shown in FIGURE 1*c*.

Both the vacuum loop box 18 and loop box 28 in addition to the above mentioned apertures include apertures for the introduction of vacuum below the loops. In box 28 the apertures are a series of ports 190 which are connected by way of manifold 191 and tube 192 to a source of vacuum such as vacuum pump 194 shown in FIGURE 1*b* as being operated by motor 196 to constantly draw on the vacuum loop box 28. The loop box 18 utilizes a single aperture or port 190*a* which is also coupled to vacuum pump 194 in similar fashion as shown in FIGURE 1*b*. The vacuum in both boxes must be sufficient to maintain the loops 19 and 29 taut within the loop boxes 18 and 28. It is desirable in the present arrangement to have a slightly greater vacuum in loop box 18 than in 28. This may be provided for by any of a number of well known means.

As is well known to those familiar with the art to which the present invention is directed, the vacuum loop boxes 18 and 28 desirably contain loops of tape which are sufficient to accommodate the difference between the acceleration and deceleration rates of the capstan 24 as compared with those of the reels 10 and 12. For optimum utilization of the capacity of the loop boxes 18 and 28, during normal reading and writing operations, one of the tape loops is maintained at its shortest practical length while the other is simultaneously maintained at its longest practical length. The loop positions corresponding to these particular lengths are referred to as the upper and lower balance points, respectively. For example, the loop 29, as shown in FIGURE 1*a*, is at its lower balance point while the loop 19 is shown at its upper balance point. These balance points are established, as will be explained subsequently, at the respective apertures 113 and 170. Similar balance points correspond to apertures 163 and 120.

With the loops 19 and 29 oriented as shown by the solid lines in FIGURE 1*a* the system is in the proper condition for accommodating a backward rotation of capstan 24 from the stopped condition. With the loops so arranged the rapid acceleration of the capstan 24 with the vacuum applied by valve 25*k* causes tape loop 19 to lengthen and tape loop 29 to shorten before the high inertia reels 10 and 12 can be moved by motors 32 and 34. With the tape loops established at the balance points shown in FIGURE 1*a* the system is also in the proper condition to accommodate a stopping of a forward rotation of capstan 24, for loop box 18 can accept the tape which will continue to spill from reel 10 and loop box 28 can supply the tape which continues to be taken up by reel 12 until the reels can be stopped.

The opposite balance points 120 and 163 must be established for the loops 19 and 29 in preparation for starting a forward rotation of capstan 24 or in preparation for stopping a backward rotation of capstan 24.

It will be evident from the above description of the optimum loop lengths for the various conditions of operation, that it will be necessary to shift the balance points which are effective to control the length of the loops of tape in each of the loop boxes 18 and 28 in response to a signal indicative of the direction in which the capstan 24 is to be rotated before it is started and the balance points will then have to be shifted after rotation begins to anticipate the stopping of capstan 24. To accomplish this control there is provided a balance point control amplifier 200 (FIGURE 3) which receives an input signal on line 202 from a relay 204 (FIGURE 1*a*) whose contact 205 is normally made with the contact 206 connected to line 81. However, when a signal representing a command for backward rotation of the capstan 24 appears on line 68 this signal is effective to set flip-flop 209 which produces a set output on line 210 which in turn energizes the coil 212 of relay 204 to cause the contact 205 to make with contact 214 after disengaging from contact 206. This energized state of relay 204 causes the tape loops 19 and 29 to take up the positions shown in FIGURE 1*a* in a manner to be later described and this state will be maintained until a signal appears on line 66 representing a command for forward rotation of capstan 24 which signal would be effective to reset flip-flop 209 causing the signal previously present on line 210 to disappear and thus releasing relay 204 by allowing coil 212 to be de-energized. Spring 208 then would re-establish contact between the contacts 205 and 206.

The sense of the signal on line 80, which is the signal controlling the balance point control amplifier 200 during the energization of relay 204 is always opposite that on line 81, which is effective to control the balance point control amplifier 200 during de-energization of relay 204. This results from inverter 90. The sense of each of these signals will depend on the presence or absence of the read-write-rewind signal at terminal 86. It will thus be evident that the balance points established for the tape loops in the vacuum loop boxes are shifted in dependence upon the presence or the absence of a read-write-rewind signal at terminal 86 as well as in dependence upon the energization or de-energization of relay 204. Thus, the loop lengths shown in FIGURE 1*a* are established when a read-write-rewind signal is not present at terminal 86 and relay 204 is energized. The same balance points will be established when the read-write-rewind signal is present at terminal 86 if relay 204 is de-energized. Likewise, an opposite orientation of the loops in the loop boxes 18 and 28 is established when the read-write-rewind signal is not present at terminal 86 and relay 204 is de-energized or under the condition in which the read-write-rewind signal is present at terminal 86 and relay 204 is energized.

Figure 2:
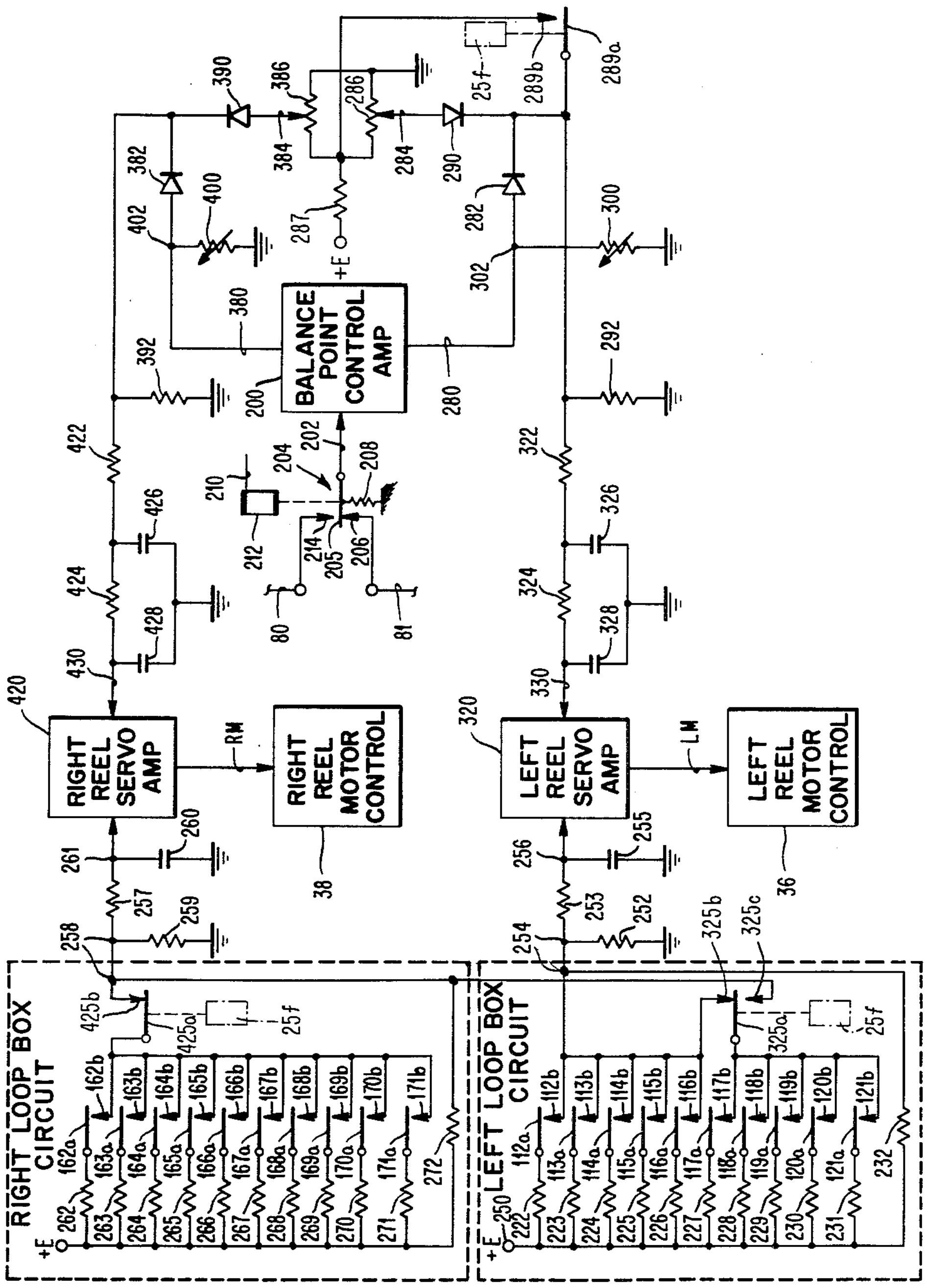
FIGURE 2 is a schematic diagram of a control circuit incorporating this invention.

Referring now to FIGURE 2, it will be seen that resistors 222–232 are effective, when rewind solenoid actuator 25*f* is de-energized, as when rewinding is not being carried out, by virtue of the parallel connections between these resistors as selectively established by the vacuum switch contacts 112*a*–121*a* and the corresponding contacts 112*b*–121*b* as well as contacts 325*a* and 325*b* to establish in combination with resistor 252 a voltage divider between the potential source +E at terminal 250 and ground potential on one side of resistor 252. This potential divider produces during operations other than rewind a potential across resistor 252 having a magnitude which is a direct function of the length of the tape loop 19 in vacuum loop box 18, for the effective resistance established by the parallel connection of resistors 222–232, as selectively established by contacts of the vacuum switches, increases as the tape loop 19 increase in length. In the left loop box, for example, only those switches 132–141 which are below the tape loop 19 will have their associated contacts made since the vacuum necessary to make the switches exists only below the tape loop.

Similarly when relay contacts 425*a* and 425*b* are made as during operations other than rewind there is established across resistor 259 a potential which is a direct function of the length of the tape loop 29 in vacuum loop box 28 in response to the selective actuation of the switch elements 162*a*–171*a* into contact with 162*b*–171*b* to determine the effective resistance of the parallel combination of resistors 262–272.

The potential across resistor 252 representing the actual tape loop length in loop box 18 would unless modified provide at terminal 254 a step-wise voltage change as the loop changed its length. In order to avoid a saturation of the control circuits for the left reel motor it is desirable to produce across resistor 252 a potential having a limited maximum rate at which the voltage changes. This is particularly necessary since a rate control is utilized as will subsequently be described. The series combination of resistor 253 and capacitor 255 which are joined at terminal 256 and coupled across resistor 252, provides this limited rate of change of potential at terminal 256.

In similar fashion resistor 257 and capacitor 260 which are joined at terminal 261 and connected in parallel to resistor 259, provide a potential at terminal 261 which is limited in its rate of change.

The potential at terminal 256 is thus representative of the length of tape loop 19 and the potential at terminal 261 is representative of the length of tape loop 29. These potentials provide one of the input signals to the reel motor controls 36 and 38, respectively. The other inputs to the controls 36 and 38 must represent the balance points desired for the loops. These other inputs are provided as described below.

The balance point control amplifier 200 is designed to produce a current in line 280 which in flowing through the preadjusted variable resistor 300 produces a potential at terminal 302 which may be either of a low value or of a high value in dependence upon the signal on line 202, except when a rewind operation is called for. In that case the signal on line 280 is maintained constant regardless of the signal on line 202 as will be explained. The potential at terminal 302 will desirably be at its high value to represent the upper balance point for left hand loop box 18 when the signal on line 202 is of the first sense, whereas it will be at its lower potential to represent the lower balance point when the signal on line 202 is of the second sense. During rewind the potential at terminal 302 is maintained at its lower potential.

The current flow from terminal 288, which is connected to a source of potential +E, through resistors 287 and 286 to ground is tapped off at adjustable tap 284 to establish a potential representing the lower balance point for the left hand loop box 18. This latter potential is higher than the potential at terminal 302 when the potential at terminal 302 is at its low value and is lower than the potential at terminal 302 when it is at its high value. It will be evident that under the first of these conditions diode 290 will be conductive whereas diode 282 will be back-biased. Under the second condition diode 282 will be conductive and diode 290 will be back-biased. There is thus produced across resistor 292 a potential which is selectively equal to that potential representing either the upper balance point or the lower balance point in dependence upon the output of balance point control amplifier 200.

The sense of the signal on line 202 and therefore the output on line 280 from the balance point control amplifier are subject to instantaneous change either as a result of the energization of relay 204 or as a result of the presence or disappearance of the read-write-rewind signal at terminal 86. It is desirable in the interest of a smooth control of the loops from one balance point to another to change the potential representing the desired loop length in a substantially linear fashion between the potentials representing the two balance points. To accomplish such a smooth variation an integrating circuit comprising resistors 322 and 324 along with capacitors 326 and 328 is utilized to provide an input on line 330 to the left reel servo amplifier 320 of potential related to the integral of the potential across resistor 292.

As will be evident from FIGURE 2, the left reel servo amplifier 320 responds to a deviation from a predetermined relationship between the input from line 330 representing the desired loop length and the input from terminal 256 representing the actual loop length and provides a control signal along output line LM to the left reel motor power control 36 corresponding to this deviation. This control signal LM effects, through the motor control 36, an operation of the left reel motor 10 in a direction and at a speed sufficient to maintain the deviation between the potential on line 330 and that at terminal 256 at or near the value, which represents balance.

The predetermined relationship referred to above may be one of equality or other relationships as may be established when the control loop length is equal to the desired loop length.

Balance point control amplifier 200 produces in line 380 a current which will establish across variable resistor 400 a potential which is of opposite sense to that established across resistor 300 except during rewind, which will be considered later. In other words, when terminal 302 is a low potential terminal 402 will be at a high potential and vice versa.

The potential established by tap 384 of resistor 386 represents the lower balance point of right hand loop box 28 and the diodes 382 and 390 function in a similar fashion to that previously described for diodes 290 and 282. There is, therefore, produced across resistor 392 a potential representing the desired balance point for the right hand loop box 28. This potential is modified by the integrating circuit composed of resistors 422 and 424 in combination with capacitors 426 and 428 to establish at input line 430 of the right reel servo amplifier 420 a potential representing the desired loop length for loop 29. The right reel servo amplifier 420 is similar to left reel servo amplifier 320 and produces output signals RM which operates the motor power control 38 similarly to the operation of motor power control 36 by output signal LM.

The potential representing the upper and lower balance points should preferably be so selected that the tape will tend to stay opposite apertures 113 and 163 for the upper balance points and opposite apertures 120 and 170 for the lower balance points.

As will be evident from FIGURE 1*a*, the apertures 112–121 and 162–171 need not be regularly spaced since close control is only necessary in the region of the upper and lower balance points. The resistors 222–231 and 262–271 may be graded to provide a change in potential across resistors 252 and 259 which are roughly a linear function of the tape length changes if the spacings are not the same.

Figure 3:
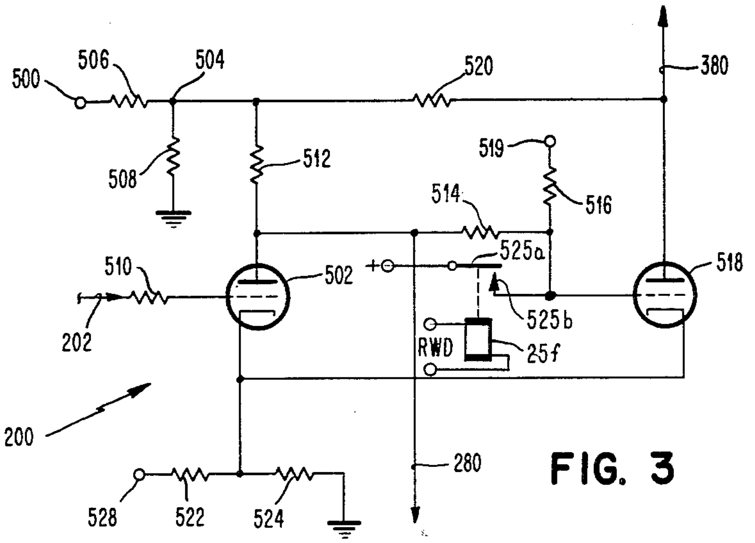
FIGURE 3 is a schematic diagram of a circuit which may be used as the Balance Point Control Amplifier.

The balance control amplifier shown in FIGURE 3 may be substituted for the amplifier shown as block 200 in FIGURES 1*a* and 2. A D.C. supply, which is provided at terminal 500, establishes the plate supply to tube 502 at terminal 504 by virtue of the voltage divider comprising resistors 506 and 508. When the signal on line 202 is in a first sense, as for example at −95 volts, the grid potential established through grid resistor 510 will cause tube 502 to be nonconductive whereas the tube will be conductive when the signal on line 202 is in a second sense, as for example at 0 volts.

When tube 502 is cutoff the current flow through plate resistor 512 is reduced to establish on line 280 a high potential. This high potential at the plate causes current flow through the voltage divider comprised of resistors 514 and 516 to a source of negative potential at terminal 519 to produce a potential on the grid of tube 518 of sufficiently high potential to cause tube 518 to be conductive.

When tube 518 is conductive, the current flow through the plate resistor 520 increases as compared with that flowing during the nonconductive state of tube 518, and the potential on line 380 is reduced to a low value. As a result, the upper balance point will be effective for loop box 18 and the lower balance point will be effective for loop box 28.

Cathode bias for both tubes 502 and 518 is supplied by the potential established at the junction of resistors 522 and 524 due to the current flowing from ground to a source of negative D.C. potential connected to terminal 528.

It will be evident that the amplifier of FIGURE 3 is a two stage amplifier which provides at lines 280 and 380 signals having either a low or high value in dependence upon the signal input at line 202. The signals on lines 280 and 380 are always maintained of opposite sense, that is when one is high the other is low except when a rewind operation is called for. The presence of a rewind signal energizes solenoid actuator 25*f* which makes contacts 525*a* and 525*b* to connect the grid of tube 518 to a sufficiently high potential to maintain it in a conductive state regardless of the potential appearing on line 202. By so tying the potential on the grid of tube 518 the potential on line 380 is maintained at its low value. As a result the lower balance point as set on tap 384 controls the action of the Right Reel Servo 420 during rewind.

Figure 4:
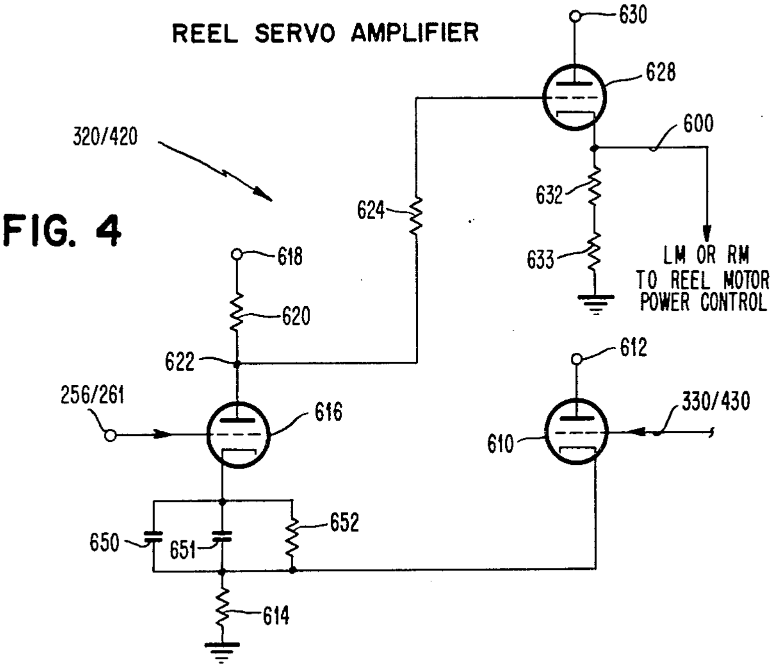
FIGURE 4 is a schematic diagram of a circuit which may be used as a Reel Servo Amplifier.

FIGURE 4 shows a reel servo amplifier which may be substituted for both the left reel servo amplifier 320 and the right reel servo amplifier 420 shown in block form in FIGURE 2. The circuit essentially serves to provide at the output line 600, which may be either the LM line of the left reel servo amplifier or the line RM of the right reel servo amplifier, a potential which varies in accordance with the deviation of the desired loop length from the actual loop length, in other words the deviation of the signals on line 330 at terminal 256 from the balanced condition.

It will be evident that a change in potential at line 330, for example, causes a change in the grid potential of tube 610 which will in turn cause a change in current flow through the tube from the D.C. source connected at terminal 612. This change in current flow will also, by virtue of cathode resistors 614, cause a change in potential at the cathode of tube 616. The result of the change in potential of the cathode in tube 616 is to change the current flow through tube 616 from the D.C. source connected to terminal 618 in a sense opposite that in tube 610. The changing current through plate resistor 620 causes a change in the potential at terminal 622 which by way of the grid resistor 624, similarly changes the potential on the grid of tube 628. As a consequence, there will then be a change in the current flow through tube 628 from the positive D.C. source connected to terminal 630. This changing current is reflected at the output line 600 which is across both cathode resistor 632 and 633. It will thus be evident that the potential at output line 600 will change in accordance with the deviation from the balance condition of the potentials on lines 330 and 430 as compared with the potentials at terminal 256 or 261, respectively. The output line 600 provides a control signal to the reel motor control such as reel motor controls 36 and 38 which causes the reel motors to rotate the reels in a direction which will cause the potential at terminal 256, for example, to change so as to substantially follow the changes in potential on line 330.

This control is enhanced by the use of a rate control which is established by the parallel combination of capacitors 650 and 651 and resistor 652 in the cathode circuit of tube 616. Since this rate circuit is not included in the cathode circuit of the tube 610 but is included in the cathode circuit of tube 616 the variation of output at line 600 will occur not only in accordance with the deviation of the potentials on line 330 and at terminal 256, but also in accordance with the rate of change of the potential at terminal 256. This rate control provides a modified control signal which is of greater magnitude during the initial period of the changes in potential occurring at terminal 256. This modified control signal on line 600 is thus effective to cause the connected reel motor to accelerate or decelerate more rapidly than would otherwise be the case after a sudden change in potential at terminal 256, as might occur as the tape passes one of the apertures.

The above described operation of the controls for the reel motors has been concerned with the normal control during reading or writing operations. The operation of the reel motor controls are modified in the rewind operation in order that the tape may be rewound from the take-up reel 12 to the supply reel 10 as rapidly as the reel drive motors 34 and 32 will allow.

The rewind mode of operation is started by the presence of a signal on line 68 signaling a backward motion and a read-write-rewind signal at terminal 86 as well as a rewind signal applied to solenoid 25*f*. The rewind signal applied to solenoid 25*f* differs from the other signals for it is present only when a rewind is called for.

When the rewind operation is initiated the signal on line 68 is present first. This signal prepares the tape for the normal backward motion and thus puts the loops in the position shown in FIGURE 1*a*. The read-write-rewind signal then comes on along with the rewind signal applied to solenoid 25*f*. The presence of the read-write-rewind signal serves to maintain the brakes 96 and 98 released so that the reel motors 32 and 34 can rotate the reels in accordance with the outputs of the reel motor controls. Also, the clutch 52 is engaged and brake 54 is released to allow a backward rotation of capstan 24 in response to the signal on line 68. This backward motion of the capstan is not effective to move the tape, however, for the rewind signal applied to solenoid 25*f* provides for the introduction of air under pressure which is effective to float the tape over the capstan in such a way that the motion of the capstan does not affect the motion of the tape.

Referring to FIGURE 2, it is also evident that the energization of solenoid 25*f* by the rewind signal is effective to change the circuits involved in the sensing of the loop lengths. The right loop box circuit and its resistors 262–271 are disconnected by the breaking of relay contacts 425*a* and 425*b* when solenoid 25*f* is energized. At the same time the relay contacts 325*a* and 325*b* are broken and 325*a* is made with contact 325*c*. This latter switching serves to divide the left hand or supply loop box into an upper and lower portion, the upper portion of which includes apertures 112–116 and the associated vacuum switch and resistors 222–226. These resistors in combination with resistor 232 are the ones which are effective to control the left reel motor by way of Left Reel Servo Amplifier 320.

The remainder of the apertures in the supply loop box, namely 117–121, are associated with a lower portion of that box and the associated vacuum switches are connected by way of contacts 325*a* and 325*c* to terminal 258 and the Right Reel Servo Amplifier 420. The resistors 227–231 and resistor 272 thus are the resistors selectively connected in parallel to control the right reel servo motor drive. It will be evident that the take-up reel speed is controlled from the lower portion of the supply loop box and the supply reel speed is under the control of the upper portion of the same loop box during rewind.

At the same time that the above mentioned changes are made in that part of the controls sensing actual loop length, solenoid 25*f* is effective to make relay contacts 289*a* and 289*b* to connect the junction between resistors 286 and 287 to the upper terminal of resistor 292. This connection effectively bypasses the diodes 282 and 290 and establishes a potential across resistor 292 which is of magnitude corresponding to that which appears across resistor 252 when the apertures 114–116 are exposed to vacuum thus connecting the resistors 224–226 and 232 in parallel. The Left Reel Servo Amplifier will then control the left reel motor 32 to try to bring the loop in box 18 opposite aperture 114. The left reel motor controls are preferably designed with the circuit parameters such that the left reel will be driven at a speed proportional to the amount the loop 19 extends below aperture 114 with the speed being a maximum when the loop 19 has extended below aperture 116. Also, the rotation of the left reel 10 should be reversed when the loop 19 is above aperture 114.

As pointed out previously the energization of the solenoid 25*f* also establishes a balance point for the Right Reel Motor Servo Amplifier 320 corresponding to the position of loop 19 opposite aperture 120, which is the lower balance point. This is effected by the making of contacts 525*a* and 525*b* (FIGURE 3) which tie down the output on line 380 to a potential lower than that at variable tap 384, thus making the potential at the variable tap, which represent the lower balance point, the one which is effective to control the right reel motor.

As previously mentioned, the initiation of the rewind mode of operation finds the tape loops 19 and 29 in the positions shown in solid lines in FIGURE 1*a*. Since the position of loop 19 opposite aperture 114 which must be established during rewind is close to the initial condition for the left or supply reel little initial drive of that reel occurs. The higher vacuum in loop box 18 causes some tape to enter from box 28 over the air bearing provided by capstan 24. The loop 19 which was opposite aperture 113 will then be opposite 114.

The balance point for the right or take-up reel is opposite aperture 120 and therefore the right reel motor 34 is energized for maximum speed unreeling the tape.

The left reel motor maintains the loop 19 opposite aperture 114 until the loop 29 has extended beyond one of the ports 190. As the end of loop 29 passes each of the ports 190 the vacuum below the loop decreases more and more. There is then less tension on the tape as a result of the decrease in vacuum. As a result more tape moves from loop box 28 toward loop box 18 over the air cushion provided by the vacuum capstan 24. The supply loop begins to grow rapidly as the right reel continues to unreel tape into the right loop box. The speed of the left reel continues to increase as the loop 19 extends past the apertures 113–115. When it extends beyond aperture 116 its speed is at a maximum. Meanwhile the right reel which has been unreeling at a maximum rate continues until loop 19 extends below aperture 117. It then decreases as the loop 19 falls farther and passes apertures 118 and 119.

If the left loop 19 drops below aperture 120 the right reel motor 34 will be reversed to develop a reel-up torque. This reversal will shorten loop 29 and raise it above the vacuum ports 190 thus causing a full vacuum to be reapplied to loop 29. The application of full vacuum to the loop 29 halts the rapid transfer of tape from the loop box 28 to loop box 18 as occurred because of the difference in tension applied to these loops. The left reel under these conditions quickly raises the loop 19 above aperture 120 and thus causes the right reel motor 34 to again change direction and reel out tape to reestablish the loop 29 to a position uncovering some of the vacuum ports 190 so that the transfer of tape from the right loop box 28 to the left loop box 18 is again reestablished.

By using the above described arrangement for rewinding it is possible to obtain an optimum rewind rate. The left reel operates at maximum speed during the first half of the rewind operation, since it then has less tape on it than does the right reel. During this period the loop 19 is in the lower portion of the box 18 and the right reel speed changes in response to the controls as they attempt to maintain loop 19 opposite aperture 120 which is the balanced condition for the right reel controls.

After the rewind is half completed the left reel contains more tape and will thus be able to reel up tape out of box 18 faster than it can be unreeled by the right reel into box 28 and transferred to box 18. The loop 19 then is in the upper portion of box 18 and the left reel controls attempt to maintain it opposite aperture 114 which is the balance point for the left reel controls. During this period the right reel is unreeling at a maximum rate.

This operation is continued until the end of the rewind approaches. At that time the rewind signal is removed from solenoid 25*f*. This may occur in response to detection of a marker on the tape such as the "load point." Removing the rewind signal from solenoid 25f serves to re-establish the vacuum on capstan 24 and re-establishes the normal circuits for detecting the loop lengths. The system is thus returned to a normal backward transport operation as would be used for reading or writing and the tape speed is under control of capstan 24 while the loops are controlled in the normal way. The tape may then be stopped in the usual way when the desired point is reached.

It will be obvious to those skilled in the art that the series of ports 190 which serve to relieve the vacuum under the tape loops may be replaced by a single port and a tapered configuration for the lower end of the loop box 28 for it is only necessary to provide a means for decreasing the tension produced in loop 29 when it extends into loop box 28 all the way.

The embodiments of the invention in which an exclusive property or privilege is claimed are defined as follows:

1. In a tape transport utilizing vacuum loop boxes to store separate lengths of tape between a supply reel and a capstan and a take-up reel and said capstan, a rewind control comprising means for controlling the speed of drive of said supply reel in response to the relative position of the tape loop end in an upper portion of the loop box associated with said supply reel, said control being operative to effect a maximum rate of drive by said supply reel when said loop end is in a lower portion of said supply reel box, means for controlling the speed of drive of said take-up reel in response to the relative position of said tape loop end in said lower portion of said supply reel loop box, said last-named means being operative to effect a maximum rate of drive by said take-up reel when said loop end is in said upper portion of said supply reel box.

2. In a tape transport having a drive capstan, a supply reel, a take-up reel, a supply vacuum box for storing a looped length of tape between said supply reel and said drive capstan, and a take-up vacuum loop box for storing a looped length of tape between said take-up reel and said drive capstan, a rewind control comprising means responsive to the length of the loop in said supply loop box when said loop length is within the limits of an upper portion of said loop box for effecting a proportional control of the speed at which said supply reel takes up tape, said means being effective when said loop extends beyond said upper portion to drive said supply reel to take up tape at its maximum rate, means responsive to the length of said loop when it extends beyond said upper portion for effecting a proportional control of the speed at which said take-up reel pays out tape, said last-named means being effective when said loop is totally contained within said upper portion to drive said take-up reel to pay out tape at its maximum rate, means associated with said take-up loop box for reducing the tape tension due to the vacuum in said take-up loop box when the loop therein exceeds a predetermined length, and means providing for a substantially frictionless movement of tape from said take-up loop box to said supply loop box.

3. In a tape transport utilizing a motor driven vacuum capstan for transporting tape past a magnetic head and having a motor driven supply reel and a motor driven take-up reel with separate loop boxes for holding loops of tape between said capstan and each of said reels, a reel motor control system for rewinding tape from the take-up reel to the supply reel comprising a plurality of vacuum operated switches associated with each of an upper and lower portion of a supply loop box adjacent the supply reel, means for establishing connection between each of said vacuum switches and a different point along the length of the supply loop box so that the vacuum established in the box under the loop of tape contained therein is effective to make the switches associated with the points along the length of said boxes under said loops, a resistor associated with each of said vacuum switches and in circuit therewith to establish for each of said portions of said supply loop a parallel network of those of said resistors associated with the vacuum switches for each of said portions which are made, circuit means including said parallel networks to establish for each of said portions a potential indicative of the deviation of the tape loop from the balance point for each portion of said supply loop box, means for establishing for each of said portions a potential representative of each said balance points, a control circuit for each of said reel motors operative in response to the deviation of the potential representative of the length of the tape loop in each of the said portions of said supply loop box from the respective balance points for energizing the respective reel motors in direction and at a speed corresponding to the sense of said deviation and its magnitude, and means for modifying the tape tension due to said take-up loop box when it contains a loop of a predetermined length substantially filling said box.

4. In a tape transport utilizing a motor driven vacuum capstan for transporting tape past a magnetic head and having a motor driven supply reel and a motor driven take-up reel with separate supply and take-up vacuum loop boxes each for holding a separate loop of tape between said capstan and said supply and take-up reels, respectively, a reel motor control system for effecting a rewind of tape from said take-up reel to said supply reel comprising means for air floating the tape over said capstan during the rewind operation, a plurality of vacuum operated switches associated with said supply reel loop box, means for exposing each of said vacuum switches to a different point along the length of said supply reel loop box so that the vacuum established in the box under the loop of tape contained therein is effective to actuate the switches associated with those points along the length of said boxes which are under said loops, a separate potential producing means associated with each of an upper and a lower portion of said supply loop box and responsive to the actuation of said switches to produce a potential indicative of the length of the tape loop in each of said portions, means for establishing for each of said portions a potential representative of a balance point for the tape loop in said supply loop box, a control circuit for each of said supply and take-up reel motors operative in response to the deviation of the potential representative of the length of the tape loop in the upper and lower portions, respectively, from their corresponding balance points for energizing the motors driving the respective supply and take-up reels to take up and pay out tape at a speed corresponding to the magnitudes of said deviations, and means for decreasing the vacuum applied to the loop in said take-up loop box when the loop therein becomes larger than a predetermined limited length.

5. A tape transport in accordance with claim 4 in which said control circuit includes means to energize the motor driving said supply reel to maximum velocity when said tape loop extends into said lower portion of said supply loop box and to energize said motor driving said take-up reel to maximum velocity when said tape loop is completely contained in said upper portion of said supply loop box.

References Cited by the Examiner

UNITED STATES PATENTS

| | | | |
|---|---|---|---|
| 2,921,753 | 1/60 | Lahti et al. | 242—55.12 |
| 2,952,415 | 9/60 | Gilson | 242—55.12 |
| 3,027,059 | 3/62 | Streeter | 242—55.12 |
| 3,091,408 | 5/63 | Schoeneman | 242—55.12 |
| 3,106,357 | 10/63 | Kobayashi et al. | 242—55.12 |
| 3,112,473 | 11/63 | Wicklund | 242—55.12 X |

FOREIGN PATENTS

| | | | |
|---|---|---|---|
| 872,441 | 7/61 | Great Britain. | |

MERVIN STEIN, *Primary Examiner.*